US012705016B2

(12) United States Patent
Narula et al.

(10) Patent No.: US 12,705,016 B2
(45) Date of Patent: Aug. 11, 2026

(54) SYSTEMS AND METHODS FOR MULTI-POINT CONTEXTUAL CONNECTIVITY FOR WIRELESS AUDIO DEVICES

(71) Applicant: Dell Products, L.P., Round Rock, TX (US)

(72) Inventors: Harpreet Narula, Austin, TX (US); Eng Kang Chng, Singapore (SG)

(73) Assignee: Dell Products L.P., Round Rock, TX (US)

(*) Notice: Subject to any disclaimer, the term of this patent is extended or adjusted under 35 U.S.C. 154(b) by 154 days.

(21) Appl. No.: 18/390,008

(22) Filed: Dec. 20, 2023

(65) Prior Publication Data

US 2025/0208824 A1 Jun. 26, 2025

(51) Int. Cl.
*G06F 3/16* (2006.01)
*H04R 1/10* (2026.01)

(52) U.S. Cl.
CPC .......... *G06F 3/165* (2013.01); *H04R 1/1041* (2013.01); *H04R 2420/07* (2013.01)

(58) Field of Classification Search
CPC .......... G06F 3/162; G06F 3/165; G06F 16/68; G06F 3/167
USPC .......... 700/94
See application file for complete search history.

(56) References Cited

U.S. PATENT DOCUMENTS

2019/0080692 A1* 3/2019 R .......... G10L 21/0272
2021/0385575 A1* 12/2021 Meiyappan .......... G06F 3/165
2021/0400167 A1* 12/2021 Heitz, III .......... G06T 5/77
2022/0066435 A1* 3/2022 Thimmanaik .......... G06T 7/0006
2022/0066730 A1* 3/2022 Warren .......... H05B 47/19
2022/0164162 A1* 5/2022 Ramasubramanian .......... G06F 1/3287
2023/0353641 A1* 11/2023 Jreij .......... H04L 41/0806
2024/0334362 A1* 10/2024 Stationwala .......... H04B 7/15507
2024/0364957 A1* 10/2024 Xiong .......... H04N 21/4108

* cited by examiner

*Primary Examiner* — Alexander Krzystan
(74) *Attorney, Agent, or Firm* — Fogarty LLP

(57) ABSTRACT

Systems and methods for multi-point contextual connectivity for wireless audio devices are described. In an illustrative, non-limiting embodiment, an Information Handling System (IHS) may include: a processor; and a memory coupled to the processor, wherein the memory comprises program instructions store thereon that, upon execution by the processor, cause the IHS to: obtain contextual information regarding audio streams for an audio stream acceptor; and transmit an audio stream to the audio stream acceptor based, at least in part, on the obtained contextual information. In some embodiments, the program instructions cause the IHS to: determine one or more available audio contexts for an audio stream acceptor; receive an audio stream; determine that an audio context value associated with the received audio stream indicates an available audio context for the audio stream acceptor; and based, at least in part, on the determination, output sound associated with the received audio stream.

20 Claims, 4 Drawing Sheets

SYSTEMS AND METHODS FOR MULTI-POINT CONTEXTUAL CONNECTIVITY FOR WIRELESS AUDIO DEVICES

FIELD

This disclosure relates generally to Information Handling Systems (IHSs), and more specifically, to systems and methods for multi-point contextual connectivity for wireless audio devices.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Peer-to-peer ("P2P") computing or networking is a distributed application architecture that partitions tasks or workloads between peers. Peers are equally privileged, equipotent participants in the network. They are said to form a peer-to-peer network of nodes. Peers make a portion of their resources, such as processing power, disk storage or network bandwidth, directly available to other network participants, without the need for central coordination by servers or stable hosts. Peers are both suppliers and consumers of resources, in contrast to the traditional client-server model in which the consumption and supply of resources are divided.

A peer-to-peer network is designed around the notion of equal peer nodes simultaneously functioning as both "clients" and "servers" to the other nodes on the network. This model of network arrangement differs from the client-server model where communication is usually to and from a central server. A typical example of a file transfer that uses the client-server model is the File Transfer Protocol ("FTP") service in which the client and server programs are distinct: the clients initiate the transfer, and the servers satisfy these requests.

Bluetooth is a short-range wireless technology standard that is used for exchanging data between fixed and mobile devices over short distances and building personal area networks ("PANs"). In the most widely used mode, transmission power is limited to 2.5 milliwatts, giving it a very short range of up to 10 meters (33 ft). It can employ UHF radio waves in the industrial, scientific and medical ("ISM") bands, from 2.402 GHz to 2.48 GHz. Up until now, it is mainly used as an alternative to wired connections, to exchange files between nearby portable devices, and to connect cell phones and music players with wireless headphones.

On Dec. 31, 2019, the Bluetooth Special Interest Group ("SIG") published the Bluetooth Core Specification Version 5.2. The new specification adds new features. Bluetooth low energy ("LE") Audio is built on top of the new 5.2 features. Bluetooth LE Audio was announced in January 2020 by the Bluetooth SIG. Compared to regular Bluetooth Audio, Bluetooth Low Energy Audio makes lower battery consumption possible and creates a standardized way of transmitting audio over BT LE. Bluetooth LE Audio also allows one-to-many and many-to-one transmission, allowing multiple receivers from one source or one receiver for multiple sources, which also can be known as Auracast. It can use a new LC3 codec. Bluetooth LE Audio can also add support for hearing aids. On Jul. 12, 2022, the Bluetooth SIG announced the completion of Bluetooth LE Audio. The standard has a lower minimum latency claim of 20-30 ms vs Bluetooth Classic audio of 100-200 ms.

The Generic Attributes ("GATT") is the name of the interface used to connect to Bluetooth LE devices. GATT defines the structure in which data is exchanged between two devices and how attributes are grouped into sets to form services. The interface has one or more Bluetooth services, identified by unique ids, that contain Bluetooth characteristics also identified by ids. A GATT client scans for devices that are advertising, connects to a chosen server device, discovers the services, discovers characteristics and then reads from, writes to or sets up a connection to receive notifications from the characteristic.

SUMMARY

Systems and methods for multi-point contextual connectivity for wireless audio devices are described. In an illustrative, non-limiting embodiment, an Information Handling System (IHS) may include: An Information Handling System (IHS), including: a processor; and a memory coupled to the processor, where the memory includes program instructions store thereon that, upon execution by the processor, cause the IHS to: obtain contextual information regarding audio streams for an audio stream acceptor; and wirelessly transmit an audio stream to the audio stream acceptor based, at least in part, on the obtained contextual information.

In some embodiments, the audio stream acceptor includes one or more wireless speakers, wireless headphones, wireless earphones, or wireless hearing aids. In some embodiments, the audio stream acceptor communicates wirelessly using a Bluetooth Low Energy (LE) Audio communication protocol. In some embodiments, an audio context value is associated with the audio stream. In some of these embodiments, the program instructions, upon execution by the processor, further cause the IHS to: determine, using the contextual information, that the audio context value of the audio stream indicates an acceptable audio context of the audio stream acceptor.

In some embodiments, the contextual information includes supported audio contexts and unsupported audio contexts of the audio stream acceptor. In some embodiments, the contextual information includes available audio contexts and unavailable audio contexts of the audio stream acceptor. In some embodiments, the program instructions, upon execution by the processor, further cause the IHS to: determine that a second audio stream should be transmitted to the audio stream acceptor based, at least in part, on the contextual information; and based, at least in part, on the determination, wirelessly transmit the second audio stream to the audio stream acceptor, where the second audio stream is for mixing with the first audio stream by the audio stream acceptor.

In some embodiments, the program instructions, upon execution by the processor, further cause the IHS to: obtain updated contextual information regarding the audio streams for the audio stream acceptor; and determine that a second audio stream should not be transmitted to the audio stream acceptor based, at least in part, on the updated contextual information. In some embodiments, the IHS is a connected initiator of the audio streams to the audio stream acceptor, where to obtain the contextual information, the program instructions, upon execution by the processor, further cause the IHS to: receive a communication from either the acceptor, or a connected manager device of the acceptor, including the contextual information.

In some embodiments, IHS is a non-connected initiator of the audio streams to the audio stream acceptor, where to obtain the contextual information, the program instructions, upon execution by the processor, further cause the IHS to: receive an announcement from either the acceptor, or a connected manager device of the acceptor, including the contextual information.

In another illustrative, non-limiting embodiment, one or more non-transitory computer-readable storage media store program instructions, that when executed on or across one or more processors of an audio stream acceptor, cause the audio stream acceptor to: determine one or more available audio contexts for the audio stream acceptor; receive an audio stream via a wireless communication protocol; determine that an audio context value associated with the received audio stream indicates an available audio context of the one or more available audio contexts for the audio stream acceptor; and based, at least in part, on the determination, output sound associated with the received audio stream.

In some embodiments, the audio stream acceptor includes one or more wireless speakers, wireless headphones, wireless earphones, or wireless hearing aids. In some embodiments, the program instructions further cause the first IHS to: receive a second audio stream via the wireless communication protocol; determine that a second audio context value associated with the second audio stream indicates a same or different available audio context of the one or more available audio contexts for the audio stream acceptor; and based, at least in part, on the determination, output sound associated with a mixing of the audio stream and the second audio stream. In some embodiments, the program instructions further cause the first IHS to: receive a second audio stream via the wireless communication protocol; determine that a second audio context value associated with the second audio stream does not indicate an available audio context of the one or more available audio contexts for the audio stream acceptor; and based, at least in part, on the determination, discard the second audio stream.

In another illustrative, non-limiting embodiment, a method includes: obtaining information regarding audio stream contexts for an audio stream acceptor; and processing a first audio stream based, at least in part, on a first comparison of a first audio context of the first audio stream with the information regarding audio stream contexts for the audio stream acceptor.

In some embodiments, the method further includes: determining that a second audio stream should not be processed based, at least in part, on a second comparison of a second audio context of the second audio stream with the information regarding audio stream contexts for the audio stream acceptor. In some embodiments, the information regarding audio stream contexts for the audio stream acceptor includes one or more available audio contexts of the audio stream acceptor, where the first comparison indicates that the first audio context of the first audio stream is one of the one or more available audio contexts of the audio stream acceptor. In some embodiments, processing the first audio stream further includes: outputting, by the audio stream acceptor, sound associated with the received audio stream. In some embodiments, processing the first audio stream further includes: transmitting, by an audio stream initiator, the first audio stream to the audio stream acceptor.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
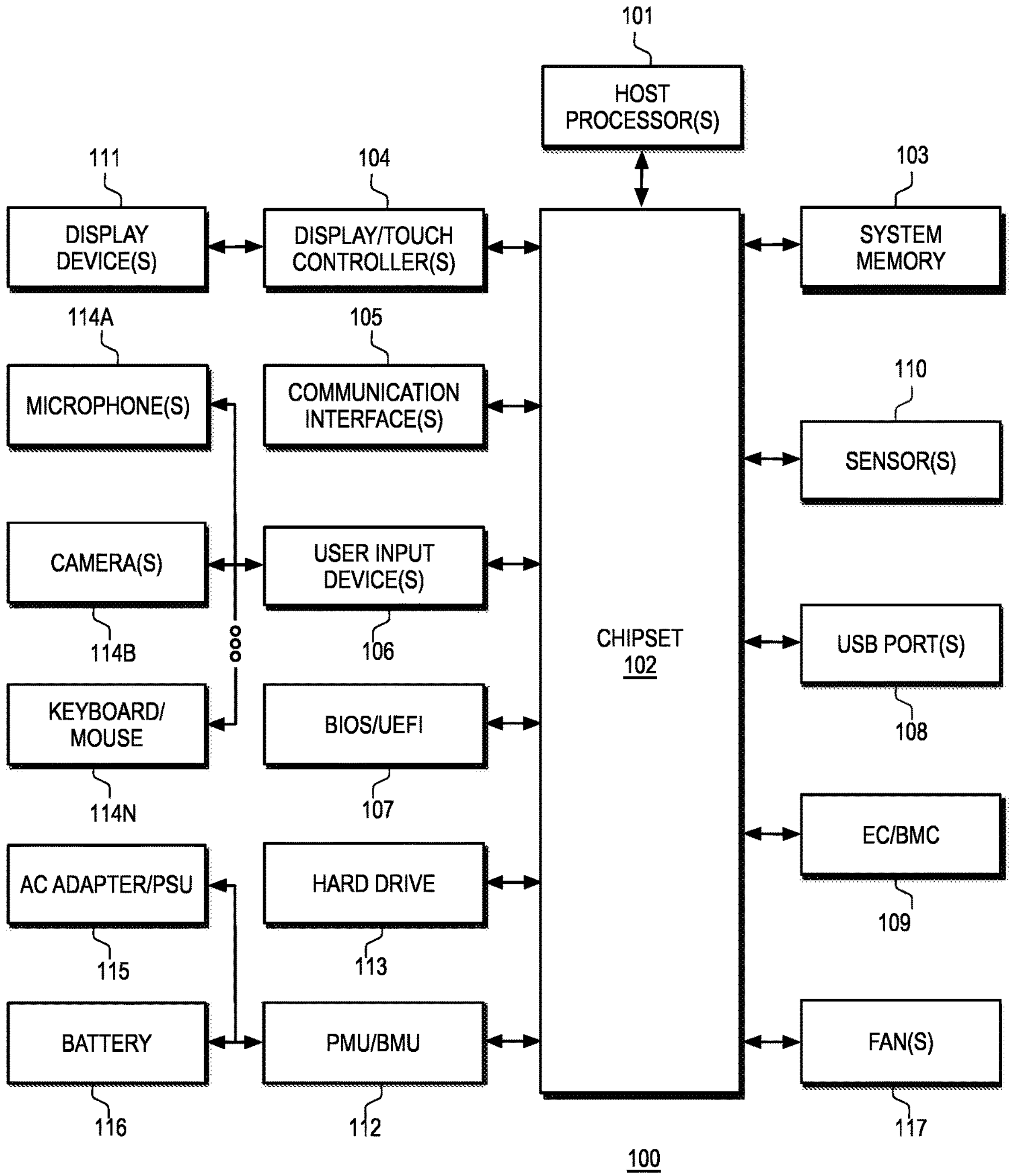
FIG. 1 is a diagram illustrating examples of hardware components of an Information Handling System (IHS), according to some embodiments.

FIG. 1 is a block diagram of hardware components of IHS 100, which may be used to implement systems and methods for multi-point contextual connectivity for wireless audio devices.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Today, multiple wireless communication technologies can be used to transmit audio, for example, from an IHS (e.g., a smartphone), which can be known as an Initator, to wireless speakers or headphones or earphones or hearing aids (i.e., an Acceptor). One common wireless communication technology is Bluetooth. With these wireless communication technologies, users typically have wireless speakers or headphones or earphones or hearing aids (i.e., an Acceptor), and can listen to voice calls, or audio or music playback. An acceptor can be any kind of device that can accept any kind of information (e.g., audio or video) using any kind of protocol over a wireless communication technology.

However, there is no mechanism whatsoever to tell the user, or the user's speaker/headphones/earphones (i.e., an Acceptor), what is the underlying context of that audio stream. For example, the commonly used Bluetooth Classic Audio specifications, i.e., the Hands-Free Profile ("HFP") Specification and the Advanced Audio Distribution Profile ("A2DP") Specification, have no mechanism to explicitly associate an audio stream with the purpose it is serving.

One way to associate an audio stream with the purpose it is serving is to use heuristics, according to some embodiments. For example, when an "AT" command, as defined in HFP, signals a call state of "Incoming" while an Extended Synchronous Connection Oriented ("eSCO") link is established, a peripheral might be able to conclude that the audio transported over the eSCO link is a ringtone. Similarly, audio transported over the Audio Video Distribution Transport Protocol ("AVDTP") Specification can sometimes be expected to be media audio. As another example, some peripherals may be able to conclude, from the presence or absence of Audio Video Remote Control Profile ("AVRCP") Specification signaling, in conjunction with audio being transported over AVDTP, that the audio being streamed is a system generated alert or a user-initiated media stream.

Such heuristics can be used by peripheral implementations to decide whether to accept or reject the establishment of a new audio stream from a second central device in situations where the peripheral was already engaged in an audio stream with a first central device, according to some embodiments. However, heuristics can involve guesswork that might not be correct. For example, there might be devices which don't follow those rules exactly. For example, AVRCP or AVDTP might be used for voice as well as media audio. However, even with the use of heuristics, the lack of any specified method to link an Audio Stream with its purpose is part of a multi-profile issue inherent in classic wireless communication audio, such as Bluetooth.

Bluetooth LE Audio is the next generation technology for Bluetooth which is designed and defined for the next generation of audio use cases. Bluetooth LE Audio is standardized, and it will begin shipping on devices in the first quarter of 2024. Bluetooth LE Audio can allow for multi-streams setup with Isochronous Channels, which can allow for multiple audio streams to be sent to an Acceptor at the same time. Bluetooth LE Audio standards can also allow for a basic audio profile, where additional metadata can be added for value-added features for Audio Acceptor devices.

With some embodiments of the systems and methods for multi-point contextual connectivity for wireless audio devices, as disclosed herein, Bluetooth LE Audio can allow for multiple streams, where multiple contexts and multiple features can then be added. Some embodiments allow for an Initiator to send a broadcast to thousands of devices. Some embodiments allow for an Initiator to send a broadcast to 10 different people in 10 different languages, for example.

As another example, at an airport there are many TVs, each of which can be playing a different sports programming or news programming or other kinds of programming. Currently, airport patrons cannot listen to that audio, unless the volume of the TV itself is turned up. However, with some embodiments of the systems and methods for multi-point contextual connectivity for wireless audio devices, airport patrons can listen into that audio. The TVs (i.e., Initiators) can send messages to the Acceptors in somewhat close proximity, so that the Acceptors or the users of the Acceptors, can receive information about the streams that are available, and can tune into a selected stream with a selected programming that corresponds with the video on a certain TV screen. Using an Acceptor (e.g., headset or earbuds or earpods), a user can listen into the programming being displayed on an airport TV.

In addition, with some embodiments of the systems and methods for multi-point contextual connectivity for wireless audio devices, a context can be associated with a broadcast stream. Therefore, the broadcast stream can set its context as news, or as announcement, or as sports programming. An initiator can send that context information with or associated with the broadcast stream, and an acceptor (e.g., headset) can choose a broadcast stream based on the context. For example, a user of an acceptor can set their context to only receive sports programming and announcements (e.g., airport announcements) and only those broadcasts will be accepted and output (e.g., amplified) by the acceptor.

In addition, with some embodiments of the systems and methods for multi-point contextual connectivity for wireless audio devices, an acceptor can be connected to multiple initiators. For example, a headset can be connected to a PC laptop computer and a smartphone simultaneously. A user can therefore by participating in a Zoom or Teams conference call using their laptop computer, with their headset can be playing the audio from that conference call. During the Zoom or Teams conference call, a phone call be received by the smartphone, and the audio stream from that phone call can be received by the headset as well. Else, during the Zoom or Teams conference call, a message might be received from an Internet-of-things ("IoT") device in the user's house, and an audio stream from that IoT device can be received by the headset as well.

Some embodiments of the systems and methods for multi-point contextual connectivity for wireless audio devices can define, or allow a user to define, what to do in these situations. Depending on the configuration, a headset might accept or reject (e.g., play or silence) a ringtone from an incoming call on the smartphone, while the user is engaged on a conference call using their laptop computer. As another example, a user can configure the headset to only interrupt an ongoing VOIP call if the incoming audio is categorized as an emergency. An emergency, for example, could be coming from multiple sources, like from an incoming call on a smartphone, or from an IoT device in the house sending a broadcast message that somebody fell down, or a kid is screaming, or somebody knocked the door.

Some embodiments of the systems and methods for multi-point contextual connectivity for wireless audio devices can mix the two streams, so that a user can be informed about what is happening, for example. For example, a headset can mix a voice prompt with either a VoIP call or a music playback. As another example, an emergency message can be mixed in, or a ringtone mixed in, with music. In another example, an acceptor (e.g., headset) can be configured to, if somebody's calling, don't play a ringtone, but if the call is from a favorite contact, then the name of that favorite contact can be announced, such as by: "Your wife is calling." With the appropriate context for audio streams, headsets themselves can perform this intelligence, without the aid of a more complex computing device such as a smartphone.

Some embodiments of the systems and methods for multi-point contextual connectivity for wireless audio devices allow various single-bit fields configured in the standard metadata of a broadcast or unicast audio stream to provide contextual information. The single-bit fields can, in some embodiments, auto configure an end-point audio stream configuration, provide audio processing configuration, provide seamless handoff of audio streams, provide mixing of multiple audio streams, provide for auto-tuning to broadcast audio streams, and/or provide for end-point priority selection, depending on the embodiment. The bit fields can be used to contextually configure the audio end-points (e.g. Headphones or Headsets), otherwise known as acceptors.

Figure 2:
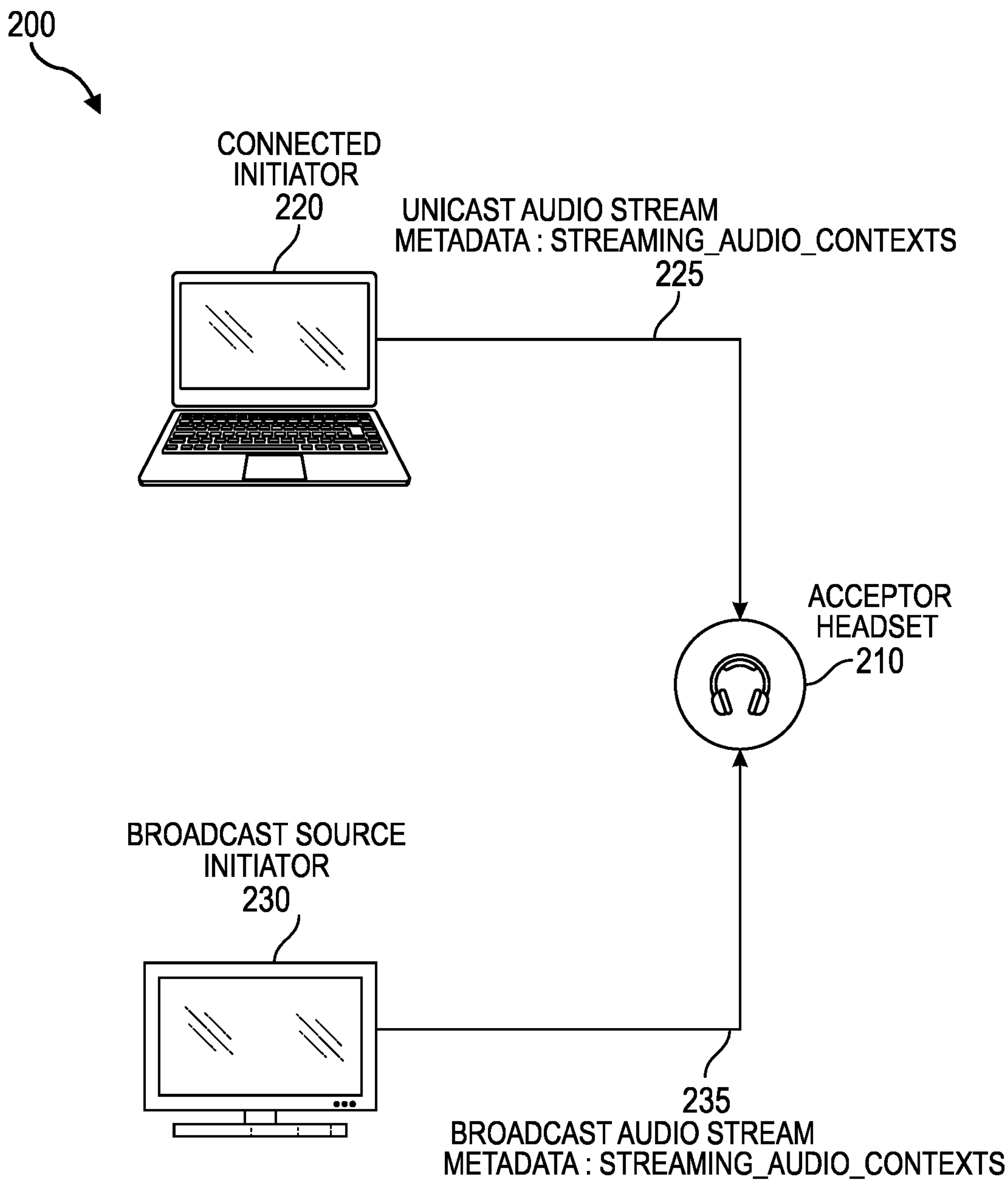
FIG. 2 is a diagram illustrating a first use case of a system for multi-point contextual connectivity for wireless audio devices, according to some embodiments.

FIG. 2 is a diagram illustrating a first use case of a system 200 for multi-point contextual connectivity for wireless audio devices, according to some embodiments. In some embodiments, system 200 may be instantiated, at least in part, through the execution of program instructions stored in system memory 103 and executed by host processor(s) 101 of IHS 100.

FIG. 2 depicts a flow of context-type information (225, 235) that is used to signal use cases of unicast and broadcast audio streams. In FIG. 2, devices and their roles are shown in boxes, while the flow of data is represented by arrows. In the system 200, an acceptor 210 (which in this example is a headset) receives a unicast audio stream 225 from a connected initiator 220, and receives broadcast audio stream 235 from a broadcast source initiator 230. The unicast audio stream 225 contains data structures (e.g., metadata) with context type information including streaming audio contexts. The broadcast audio stream 235 contains data structures (e.g., metadata) with context type information including streaming audio contexts.

Embodiments of the systems and methods for multi-point contextual connectivity for wireless audio devices can support many other different kinds of use cases, in addition to the use case of FIG. 2. For example, an acceptor (e.g., headset) can be connected to multiple initiator devices from which it receives audio streams, and can determine the stream context of the audio streams using a single bit of context type information (e.g., metadata) that is embedded in, or associated with, the audio streams. As another example, an acceptor can mix a locally stored ringtone along with the audio from a connected initiator device depending on the context type information. As another example, a connected smartphone may send an audio stream to an acceptor (e.g., headset), which is an audible mix of audio from a media player and a ringtone signaling an incoming call. In this scenario, the smartphone can set the context type values of <<Media>> and <<Ringtone>> to true in a context type bitfield, for the duration of time that the streaming media includes the ringtone for the incoming call. When the ringtone stops, the smartphone can then reset the bit for <<Ringtone>> to false in the context type bitfield.

In some embodiments, the same context bit can be configured for different tasks. For example, an audio stream assigned with the audio context value of <<Ringtone>> can contain a person's favorite song, a voice announcing the caller's name, or a ringing bell. The audio context value can be an indication of the purpose of the audio stream.

In some embodiments, Bluetooth LE Audio can support connecting to broadcast audio streams using Bluetooth technology (e.g., Auracast). Standards can allow for broadcast streams to be made available to an acceptor (e.g., headset). Some embodiments of the present invention can allow these broadcast streams to be selected by a user (e.g., using an app on a smartphone). For example, a broadcast stream can set an audio context value of <<Announcement>> to true in an audio context value bitfield on an airplane. An acceptor (e.g., headset) can then pause the streaming audio from a personal video playback device, and instead render the broadcast stream associated with the audio context of <<Announcement>> on the headset, depending the user profile configuration of the headset. A different source, like a TV, can provide an audio stream with the context set as <<NEWS>>. This audio stream can also be accepted or ignored by the headset, depending the user profile configuration of the headset.

As an example of another use case, a hearing-impaired person wearing Bluetooth enabled hearing aids might be participating in an important meeting and does not want to be disturbed by any audio stream other than an audio stream with a context set as <<Emergency alarm>>. The hearing aids can signal availability for only <<Emergency alarm>> audio streams to any initiator, so that initiator may only connect if there is an emergency.

In some embodiments, an acceptor (e.g., headset) can tailor its audio processing to a use case. For example, a headset could automatically enable active noise cancelation while receiving an audio stream for the associated with an <<Emergency alarm>> context, such that the user can clearly hear an alarm in a noisy environment.

In some embodiments, an acceptor (e.g., headset) can set its availability as a function of the audio context values associated with an audio stream that it currently maintains. For example, while maintaining an audio stream with a first initiator with a <<Conversational>> context, as in an audio stream for a phone call, the headset might be unavailable for an audio stream with a <<Media>> context. The headset can communicate this unavailability by, for example, setting the audio context value of <<Media>> to false in an Available Audio Contexts bitfield. The headset can thereby avoid the audio of an ongoing phone call from being interrupted by a media audio stream from another initiator.

In some embodiments, an acceptor (e.g., headset) can set its availability as a function of the audio context values associated with an audio stream that it currently maintains. For example, while maintaining an audio stream with a first initiator with a <<Conversational>> context, as in a VoIP meeting, the headset can be available for an audio stream with a <<Critical Conversation>> context, as in a phone call from a favorite marked contact on the smartphone.

Therefore, some embodiments of the systems and methods for multi-point contextual connectivity for wireless audio devices enable contextual configuration for audio stream management in multi-audio source environment, including multiple connected, non-connected and broadcast devices. In addition, some embodiments allow audio context values to be assigned to an audio stream, independent of the context of the audio stream. In addition, some embodiments provide a method to personalize the audio streams on the acceptor (e.g., headset), with an ability to mix local and remote audio streams with or without audio streams from connected or non-connected devices. In addition, some embodiments allow for a new audio context to be added after the acceptor (e.g., headset) may already be manufactured, in order to allow for an initiator to support new audio contexts.

Figure 3:
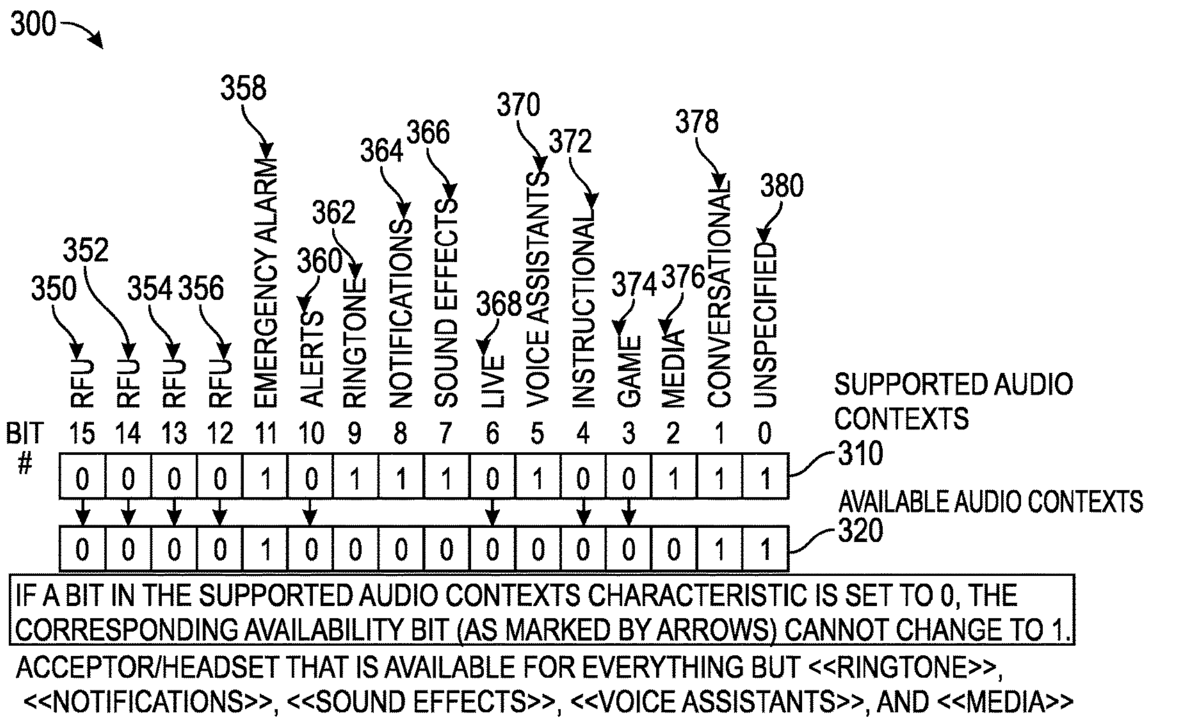
FIG. 3 is a first example of audio contextual values of an acceptor or headset device implementing multi-point contextual connectivity for wireless audio devices, showing supported audio contexts for different categories of audio, and available audio contexts for the different categories of audio, according to some embodiments.

FIG. 3 is a first example of audio contextual values 300 of an acceptor (e.g., headset) device implementing multi-point contextual connectivity for wireless audio devices, showing supported audio contexts 310 for different categories of audio (350-380), and available audio contexts 320 for the different categories of audio (350-380), according to some embodiments.

In FIG. 3, the different categories of audio are encoded as different bits in a bitfield. For both the supported audio contexts 310 bitfield, and the available audio contexts 320 bitfield, the meaning of the bits in the bitfield are the same. In both bitfields, bits 15-12 (350, 352, 354, 356) are reserved for future use ("RFU"). Bit 11 (358) encodes an <<Emergency alarm>> context.

Bit 10 (360) encodes an <<Alerts>> context. Bit 9 (362) encodes a <<Ringtone>> context. Bit 8 (364) encodes a <<Notifications>> context. Bit 7 (366) encodes a <<Sound Effects>> context. Bit 6 (368) encodes a <<Live>> context. Bit 5 (370) encodes a <<Voice Assistants>> context. Bit 4 (372) encodes an <<Instructional>> context. Bit 3 (374) encodes a <<Game>> context. Bit 2 (376) encodes a <<Media>> context. Bit 1 (378) encodes a <<Conversational>> context. Bit 0 (380) encodes an <<Unspecified>> context.

The supported audio contexts 310 bitfield stores the audio contexts which the acceptor device supports (e.g., can process and output). The supported audio contexts 310 bitfield can be factory provisioned by, for example, the manufacturer of the acceptor, in some embodiments. The available audio contexts bitfield 320 stores the audio contexts with the acceptor device is available to process and output. This available audio contexts bitfield 320 can be set by the user (or an application under the user's control) based on the user's preferences and/or the current operating context of the acceptor, in some embodiments. As described in FIG. 3, if a bit in the supported audio contexts 310 bitfield is set to 0, then the corresponding bit in the available audio contexts 320 bitfield (as marked by the downward arrows of FIG. 3) cannot be set to a "1". This means that if an audio context is not even supported, then there is no way it can be available.

In FIG. 3, the audio contexts of <<Emergency alarm>>, <<Ringtone>>, <<Notifications>>, <<Sound Effects>>, <<Voice Assistants>>, <<Media>>, <<Conversational>>, and <<Unspecified>> are supported. These might be set by a device manufacturer during manufacturing, for example. In the current user configuration, the audio contexts of <<Emergency alarm>>, <<Conversational>>, and <<Unspecified>> are available. These contexts might be set by a user of the acceptor (e.g., headset) or an application under the user's control, for example. Therefore, as stated at the bottom of FIG. 3, the acceptor (e.g., headset) is available for every audio context that it supports, except for the <<Ringtone>>, <<Notifications>>, <<Sound effects>>, <<Voice assistants>>, and <<Media>> audio contexts.

A service, such as a Published Audio Capabilities ("PAC") service, can run on acceptor (e.g., headset) devices, which can be used to share the capabilities and context of the acceptor devices with initiator (e.g., audio source) devices. To connected initiators, an acceptor (e.g., headset) can signal support for audio context values through GATT characteristic supported audio contexts, according to some embodiments. To unconnected initiators, an acceptor (e.g., headset) can signal availability through general or targeted announcements, according to some embodiments. These announcements can be basic audio profile ("BAP") announcements, in some embodiments.

An acceptor (e.g., headset) can, in some embodiments, have a built-in intelligence, where it can define its own context on its own. Then, the acceptor (e.g., headset) can communicate their contexts to different initiator devices, such as for example connected devices like a paired PC, or unconnected initiators like a broadcast source in an airport. An acceptor (e.g., headset) can communicate its supported audio contexts 310 and/or available audio contexts 320 and/or what to do with a specific audio context to initiators, and therefore operate autonomously, in some embodiments.

In some embodiments, an acceptor (e.g., headset) can outsource or offload that capability to a different device. For example, consider a user who has a smartphone, and connects their earbuds to the smartphone. Then with the smartphone, or an app on the smartphone, the user can reconfigure their audio context preferences. In this case, the user can define their own policy of what they want to do and when. The audio contexts can be configurable. A smartphone can then communicate the audio context to any connected devices (e.g., the other devices that the earbuds are paired with). The smartphone can communicate to the paired devices the user-defined policy, such that the user should only be disturbed under the conditions defined in the policy. Otherwise, the user should not be disturbed, per the policy. Therefore, a user can inform paired devices what to do and under what conditions.

Figure 4:
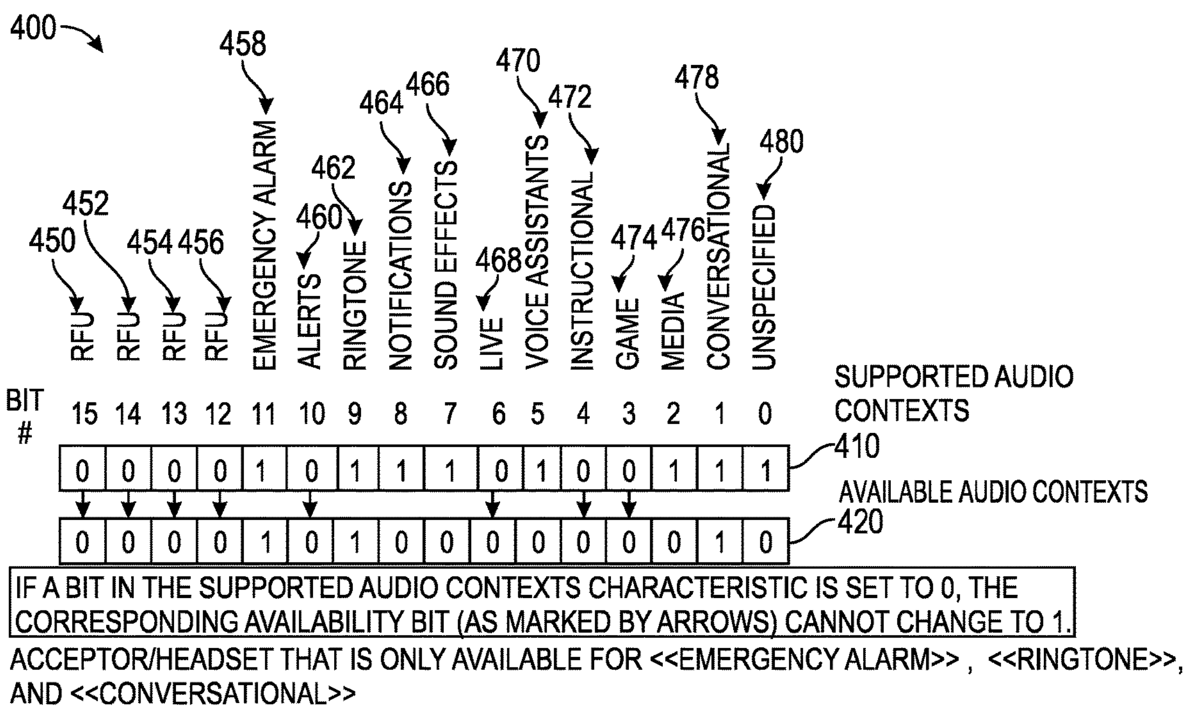
FIG. 4 is a second example of contextual values of an acceptor or headset device implementing multi-point contextual connectivity for wireless audio devices, showing supported audio contexts for different categories of audio, and available audio contexts for the different categories of audio, according to some embodiments.

FIG. 4 is a second example of audio contextual values 400 of an acceptor (e.g., headset) device implementing multi-point contextual connectivity for wireless audio devices, showing supported audio contexts 410 for different categories of audio (450-480), and available audio contexts 420 for the different categories of audio (450-480), according to some embodiments.

In FIG. 4, the different categories of audio are encoded as different bits in a bitfield. For both the supported audio contexts 410 bitfield, and the available audio contexts 420 bitfield, the meaning of the bits in the bitfield are the same. In both bitfields, bits 15-12 (450, 452, 454, 456) are reserved for future use ("RFU"). Bit 11 (458) encodes an <<Emergency alarm>> context. Bit 10 (460) encodes an <<Alerts>> context. Bit 9 (462) encodes a <<Ringtone>> context. Bit 8

(464) encodes a <<Notifications>> context. Bit 7 (466) encodes a <<Sound Effects>> context. Bit 6 (468) encodes a <<Live>> context. Bit 5 (470) encodes a <<Voice Assistants>> context. Bit 4 (472) encodes an <<Instructional>> context. Bit 3 (474) encodes a <<Game>> context. Bit 2 (476) encodes a <<Media>> context. Bit 1 (478) encodes a <<Conversational>> context. Bit 0 (480) encodes an <<Unspecified>> context.

The supported audio contexts 410 bitfield stores the audio contexts which the acceptor device supports (e.g., can process and output). The supported audio contexts 410 bitfield can be factory provisioned by, for example, the manufacturer of the acceptor, in some embodiments. The available audio contexts bitfield 420 stores the audio contexts with the acceptor device is available to process and output. This available audio contexts bitfield 420 can be set by the user (or an application under the user's control) based on the user's preferences and/or the current operating context of the acceptor, in some embodiments. As described in FIG. 4, if a bit in the supported audio contexts 410 bitfield is set to 0, then the corresponding bit in the available audio contexts 420 bitfield (as marked by the downward arrows of FIG. 4) cannot be set to a "1". This means that if an audio context is not even supported, then there is no way it can be available.

In FIG. 4, the audio contexts of <<Emergency alarm>>, <<Ringtone>>, <<Notifications>>, <<Sound Effects>>, <<Voice Assistants>>, <<Media>>, <<Conversational>>, and <<Unspecified>> are supported. These might be set by a device manufacturer during manufacturing, for example. In the current user configuration, the audio contexts of <<Emergency alarm>>, <<Ringtone>>, and <<Conversational>> are available. These contexts might be set by a user of the acceptor (e.g., headset) or an application under the user's control, for example. Therefore, as stated at the bottom of FIG. 4, the acceptor (e.g., headset) is available only for the following audio contexts: <<Emergency alarm>>, <<Ringtone>>, and <<Conversational>>.

As shown in FIGS. 3 and 4, acceptors (e.g., headsets) can be configured to support the audio context value <<Unspecified>>. Using the audio context value <<Unspecified>>, an initiator can remap an audio stream, with an audio context value that an acceptor does not support, to the audio context value <<Unspecified>>. This enables acceptors to be forward compatible. An acceptor, that is available for the audio context value <<Unspecified>>, can accept audio streams from initiators that use audio context values that might be defined after the acceptor was manufactured.

Figure 5:
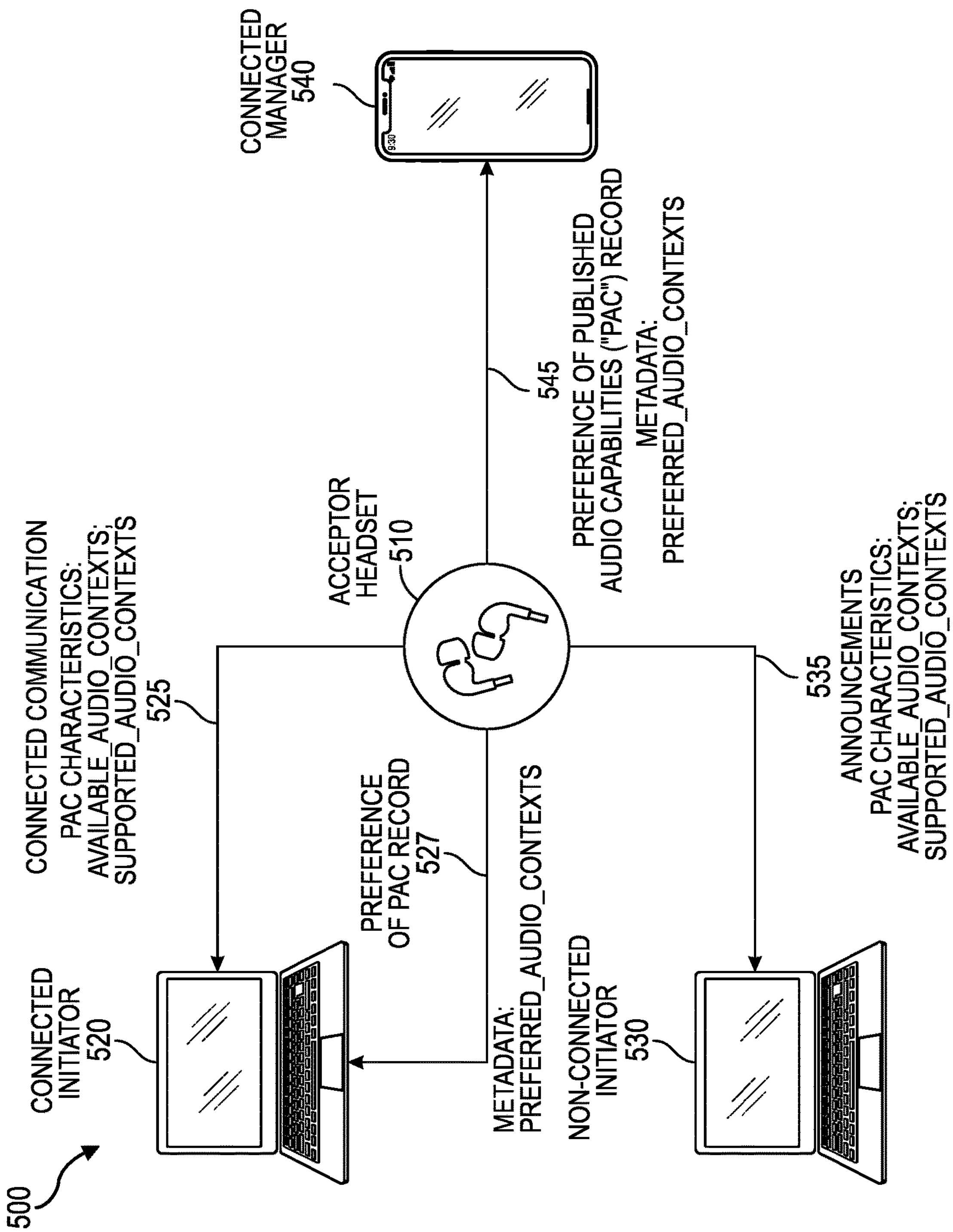
FIG. 5 is a diagram illustrating a second use case of a system for multi-point contextual connectivity for wireless audio devices, according to some embodiments.

FIG. 5 is a diagram illustrating a second use case of a system 500 for multi-point contextual connectivity for wireless audio devices (depicted as acceptor headset 510), according to some embodiments. FIG. 5 depicts the flow of audio context information as used to signal support, availability, and configuration preferences for audio context values. In some embodiments, system 500 may be instantiated, at least in part, through the execution of program instructions stored in system memory 103 and executed by host processor(s) 101 of IHS 100.

Referring back to FIG. 2, the acceptor 210 received two different audio streams (225, 235) with two different contexts. Now in FIG. 5, the acceptor 510 decides what it wants to do based on its the context. Based on the context, its supported audio contexts, its manufacturer default configuration (such as, a manufacturer's default configuration might automatically prefer an emergency audio context over anything else), and its user configuration, an acceptor can produce published audio capabilities ("PAC"), in some embodiments. In other embodiments, An external (connected) manager device 540 (e.g., smartphone) can be used to offload the connectivity and audio contexts management of the acceptor 510. The characteristics of the PAC can include supported audio contexts (e.g., the supported audio contexts bitfield (310, 410) of FIGS. 3 & 4), and available audio contexts (e.g., the available audio contexts bitfield (320, 420) of FIGS. 3 & 4).

The acceptor 510 (or an external manager device 540 (e.g., smartphone)) can provide these PAC characteristics to any connected initiators (such as 520) through a connected communication 525. The acceptor 525 can provide PAC characteristics as audio context information within data structures (e.g., metadata) of the connected communication 525. The PAC characteristics can include supported audio contexts (e.g., the supported audio contexts bitfield (310, 410) of FIGS. 3 & 4), and/or available audio contexts (e.g., the available audio contexts bitfield (320, 420) of FIGS. 3 & 4) of the acceptor 510.

The acceptor 510 (or an external manager device 540 (e.g., smartphone)) can provide these PAC characteristics to any non-connected initiators (such as 530) through announcements 535. These announcements 535 can be basic audio profile ("BAP") announcements, in some embodiments. The acceptor 525 can provide PAC characteristics as audio context information within data structures (e.g., metadata) of the announcements 535. The PAC characteristics can include supported audio contexts (e.g., the supported audio contexts bitfield (310, 410) of FIGS. 3 & 4), and/or available audio contexts (e.g., the available audio contexts bitfield (320, 420) of FIGS. 3 & 4) of the acceptor 510.

The acceptor 510 can provide a preference of its PAC record (527, 545) communication to any connected devices (e.g., 520 and 540). The acceptor 525 can provide preferred audio contexts as audio context information within data structures (e.g., metadata) of a communication (527, 545) to the connected initiator 520 and the connected manager 540. Preferred audio contexts can be the audio contexts which the acceptor 510 prefers to accept and output or amplify (e.g., through its speakers). The preferred audio contexts might be a ranking of audio contexts, or a categorization of audio contexts into one or more preferable or non-preferable categories, for example. This preferred audio context information can be used by an initiator or acceptor, depending on the embodiment, to decide which audio stream, associated with which audio context, to select, if two or more audio streams with two or more different audio contexts are available.

The Published Audio Capabilities ("PAC") service can run on a specific acceptor device like a headset. The acceptor can have this service running on the device itself which maintains supported audio contexts, available audio contexts, and preferred audio contexts.

The supported audio contexts can define what audio contexts the acceptor supports. An acceptor might not support certain audio contexts because of, for example, delays and latencies and certain things which are inherent for that audio context. For example, gaming headsets have specific criteria, or key performance indicators ("KPIs"), for a gaming headset. If an ordinary acceptor (e.g., headset) can't meet those gaming headset requirements, for latency and delays for example, then the ordinary acceptor will not include the audio contexts <<Game>>, for example, in its list of supported audio contexts. If the acceptor 510 does not even support an audio context, such as the audio context <<Game>>, then it cannot be active in the list of available audio contexts.

However, that ordinary acceptor might be able to meet the latency requirements for music. For example, audio contexts for <<Music>> or <<Media>> might have more lax latency requirements (but, for example, might have more stringent requirements on packet loss). For example, a user that is listening to music doesn't care too much about latency, because if the music plays 50 milliseconds later, the user doesn't care or even notice. Therefore, the ordinary acceptor that is able to meet the more lax latency requirements for music will include the audio contexts for <<Music>> or <<Media>>, for example, in its list of supported audio contexts.

Within a specific audio context, an acceptor 510 (or a connected manager 540 associated with an acceptor) might maintain a list of available audio contexts for a specific audio context that is in use. For example, a user might already in a phone call, and therefore the <<Conversational>> audio context might be in use. In that <<Conversational>> audio context, the user might be available for emergencies but not available for another ringtone. For example, if somebody calls the user while the user is in a meeting, the user doesn't want to be disturbed, and doesn't want their headset to disturb them in the meeting. However, a user does want to be disturbed for emergencies. Therefore, in the available audio contexts, the audio context of <<Ringtone>> can be configured as inactive (e.g., "0") while the <<Conversational>> audio context is in use, and the audio context of <<Emergency alarm>> can be configured as active (e.g., "1") while the <<Conversational>> audio context is in use.

Therefore, the available audio contexts can change based on the current context that is in use. For example, if a user is in a conversation, and wants to be disturbed by emergencies, then those bits corresponding to emergencies can be activated in the list of available audio contexts. If a user is in a conversation, and wants to hear when another phone call arrives, so he/she can decide at that time whether to take the call, then the audio context of <<Ringtone>> can be configured as active (e.g., "1") while the <<Conversational>> audio context is in use.

When the available audio context is changed, the acceptor 510 (or a connected manager 540 associated with an acceptor) can actually send this out that information to the appropriate initiator device, or to all connected initiator devices, or to all initiator devices, depending on the embodiment. The initiator devices can then send the appropriate audio stream to the acceptor based on the available audio context received from the acceptor 510 (or a connected manager 540 associated with an acceptor), in some embodiments. In other embodiments, the acceptor 510 might receive all audio streams, and based on its current available audio contexts, decide itself which audio streams to output (e.g., amplify on its speakers) for the user.

For example, if the connected initiator device is a smartphone, the smartphone would know what the user preferences are, and what the current audio context that is in use. Then the smartphone can choose whether to send that ringtone or not to the acceptor, based on the user preferences (such as specified by the available audio contexts or the preferred audio contexts), in some embodiments. In other embodiments, the smartphone will send the acceptor the ringtone no matter what, and then the acceptor can choose whether or not the user will hear the ringtone based on its internal user preferences (such as its currently available audio contexts, or its preferred audio contexts).

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises"

and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:

a processor; and a memory coupled to the processor, wherein the memory comprises program instructions stored thereon that, upon execution by the processor, cause the IHS to:

obtain contextual information that comprises a supported audio contexts bitfield and an available audio contexts bitfield announced by an audio stream acceptor with regard to audio streams for the audio stream acceptor, wherein the supported audio contexts bitfield and the available audio contexts bitfield each comprise a plurality of bits, wherein each bit is configured to correspond to an audio context value of a respective audio context of a plurality of audio contexts which comprise an Emergency alarm audio context, a Media audio context, a Conversational audio context, and an Unspecified audio context;

determine, based at least in part on the supported audio contexts bitfield, whether the supported audio contexts bitfield has an indication of support for at least one audio context value associated with the audio streams, and when the supported audio contexts bitfield does not indicate support for the at least one audio context value associated with the audio streams, remap the audio context value to an Unspecified audio context value;

compare an audio context value, as remapped when applicable, associated with the audio streams to the available audio contexts bitfield; and in response to a determination, based at least in part on the comparison, that the audio context value comprises an indication of an available audio context of the audio stream acceptor, wirelessly transmit an audio stream to the audio stream acceptor.

2. The IHS of claim 1, wherein the audio stream acceptor comprises one or more wireless speakers, wireless headphones, wireless earphones, or wireless hearing aids.

3. The IHS of claim 2, wherein the audio stream acceptor is configured to communicate wirelessly using a Bluetooth Low Energy (LE) Audio communication protocol.

4. The IHS of claim 1, wherein an audio context value is associated with the audio stream.

5. The IHS of claim 4, wherein the program instructions, upon execution by the processor, further cause the IHS to:

determine, based at least in part on the contextual information, that the audio context value of the audio stream indicates an acceptable audio context of the audio stream acceptor.

6. The IHS of claim 1, wherein the contextual information comprises an indication of supported audio contexts and unsupported audio contexts of the audio stream acceptor.

7. The IHS of claim 1, wherein the contextual information comprises an indication of available audio contexts and unavailable audio contexts of the audio stream acceptor.

8. The IHS of claim 1, wherein the program instructions, upon execution by the processor, further cause the IHS to:

determine that another audio stream should be transmitted to the audio stream acceptor based, at least in part, on the contextual information; and based, at least in part, on the determination, wirelessly transmit the other audio stream to the audio stream acceptor, wherein the other audio stream is to be mixed with the audio stream by the audio stream acceptor.

9. The IHS of claim 1, wherein the program instructions, upon execution by the processor, further cause the IHS to:

obtain updated contextual information in regard to the audio streams for the audio stream acceptor, wherein the updated contextual information comprises an updated available audio contexts bitfield announced by the audio stream acceptor, and wherein the available audio contexts bitfield was updated by the audio stream acceptor as a function of an audio context value associated with an audio stream currently maintained by the audio stream acceptor; and determine that another audio stream should not be transmitted to the audio stream acceptor based, at least in part, on the updated contextual information.

10. The IHS of claim 1, wherein the IHS is a connected initiator of the audio streams to the audio stream acceptor, and wherein to obtain the contextual information, the program instructions, upon execution by the processor, further cause the IHS to:

receive a communication from either the audio stream acceptor, or a connected manager device of the audio stream acceptor, comprising the contextual information.

11. The IHS of claim 1, wherein the IHS is a non-connected initiator of the audio streams to the audio stream acceptor, and wherein to obtain the contextual information, the program instructions, upon execution by the processor, further cause the IHS to:

receive an announcement from either the audio stream acceptor, or a connected manager device of the audio stream acceptor, comprising the contextual information.

12. One or more non-transitory computer-readable storage media configured with stored program instructions, that when executed on or across one or more processors of an audio stream acceptor, cause the audio stream acceptor to:

maintain a supported audio contexts bitfield and an available audio contexts bitfield for the audio stream acceptor, wherein the supported audio contexts bitfield and the available audio contexts bitfield each comprise a plurality of bits, wherein each bit is configured to correspond to an audio context value of a respective audio context of a plurality of audio contexts which comprise an Emergency alarm audio context, a Media audio context, a Conversational audio context, and an Unspecified audio context, and wherein a bit set to 0 in the supported audio contexts bitfield is configured to prevent a change of a respective bit in the available audio contexts bitfield to 1;

receive an audio stream via a wireless communication protocol;

update, based at least in part on an audio context value associated with the received audio stream, the available audio contexts bitfield;

determine that an audio context value associated with the received audio stream comprises an indication of one or more available audio contexts for the audio stream acceptor and discard another audio stream whose audio context value does not indicate an available audio context, based at least in part upon the available audio contexts bitfield; and based, at least in part, on the determination, output sound associated with the received audio stream.

13. The one or more non-transitory computer-readable storage media of claim 12, wherein the audio stream acceptor comprises one or more wireless speakers, wireless headphones, wireless earphones, or wireless hearing aids.

14. The one or more non-transitory computer-readable storage media of claim 12, wherein the program instructions further cause the audio stream acceptor to:

receive another audio stream via the wireless communication protocol;

determine that another audio context value associated with the other audio stream comprises an indication of a same or different available audio context of the one or more available audio contexts for the audio stream acceptor; and based, at least in part, on the determination, output sound associated with a mix of the audio stream and the other audio stream.

15. The one or more non-transitory computer-readable storage media of claim 12, wherein the program instructions further cause the audio stream acceptor to:

receive another audio stream via the wireless communication protocol;

determine that another audio context value associated with the other audio stream does not indicate an available audio context of the one or more available audio contexts for the audio stream acceptor, based at least in part upon the available audio contexts bitfield; and based, at least in part, on the determination, discard the other audio stream.

16. A method comprising:

obtaining information regarding audio stream contexts from a Basic Audio Profile (BAP) announcement comprising Published Audio Capabilities (PAC) characteristics that comprise a supported audio contexts bitfield and an available audio contexts bitfield for an audio stream acceptor, wherein the supported audio contexts bitfield and the available audio contexts bitfield each include a plurality of bits, wherein each bit corresponds to an audio context value of a respective audio context of a plurality of audio contexts comprising an Emergency alarm audio context, a Media audio context, a Conversational audio context, and an Unspecified audio context; and processing a first audio stream based, at least in part, on a first comparison of a first audio context of the first audio stream with the supported audio contexts bitfield and the available audio contexts bitfield for the audio stream acceptor, wherein when the supported audio contexts bitfield indicates that the audio stream acceptor does not support the first audio context, the first audio context is remapped to the Unspecified audio context for the first comparison.

17. The method of claim 16, further comprising:

determining that a second audio stream should not be processed based, at least in part, on a second comparison of a second audio context of the second audio stream with the supported audio contexts bitfield and the available audio contexts bitfield for the audio stream acceptor.

18. The method of claim 16, wherein the supported audio contexts bitfield and the available audio contexts bitfield for the audio stream acceptor comprise one or more available audio contexts of the audio stream acceptor, and wherein the first comparison indicates that the first audio context of the first audio stream is one of the one or more available audio contexts of the audio stream acceptor.

19. The method of claim 16, wherein processing the first audio stream further comprises:

outputting, by the audio stream acceptor, sound associated with the first audio stream.

20. The method of claim 16, wherein processing the first audio stream further comprises:

transmitting, by an audio stream initiator, the first audio stream to the audio stream acceptor.

* * * * *